United States Patent [19]
Van de Moortele

[11] 3,927,601
[45] Dec. 23, 1975

[54] DEVICE FOR MEASURING LIQUIDS OR GASSES

[75] Inventor: Guido Ivo Van de Moortele, Bribel, Belgium

[73] Assignee: Unitas S.A., Luxemburg

[22] Filed: Jan. 23, 1974

[21] Appl. No.: 435,766

[30] Foreign Application Priority Data
Jan. 29, 1973  Belgium ............................... 52482
Apr. 19, 1973  Belgium ............................... 52705

[52] U.S. Cl. ....................... 91/329; 73/264; 73/268
[51] Int. Cl.² ..................... F01L 15/18; G01F 3/20
[58] Field of Search ............. 91/271, 272, 273, 329; 73/243, 264, 268; 137/99; 222/57

[56] References Cited
UNITED STATES PATENTS

| 16,049 | 11/1856 | Darlington et al. ................... 73/264 |
|---|---|---|
| 740,892 | 10/1903 | Meyer ............................... 91/329 X |
| 840,886 | 1/1907 | Wilkins ................................ 91/329 |
| 1,241,783 | 10/1917 | Tocknell ........................... 91/329 X |
| 2,123,577 | 7/1938 | Pelich ............................. 73/268 X |
| 2,699,153 | 1/1955 | Russell .......................... 91/273 X |
| 2,890,682 | 6/1959 | Swanson .......................... 91/329 X |
| 3,276,381 | 10/1966 | Harklau et al. .................... 91/329 X |
| 3,312,172 | 4/1967 | Harklau et al. .................... 91/329 X |
| 3,329,094 | 7/1967 | Harklau et al. .................... 91/329 X |
| 3,548,716 | 12/1970 | Rayl ................................. 91/329 X |

*Primary Examiner*—Alan Cohan
*Assistant Examiner*—Gerald A. Michalsky
*Attorney, Agent, or Firm*—Ulle C. Linton

[57] ABSTRACT

The invention concerns a device by means of which it is possible to measure very precisely determined quantities of liquids or gasses, and such through the intermediary of a meter which is connected to the device. The device can also be used as a dosimeter for the dosage of several liquids or gasses with precision.

3 Claims, 4 Drawing Figures

DEVICE FOR MEASURING LIQUIDS OR GASSES

DESCRIPTION

For the present purpose use is made of a device mainly consisting of at least two separate chambers with a determined content, of a common inlet for both chambers, of a common outlet for both chambers, between inlet and the two chambers of a closing means for alternately admitting the medium in each chamber, between outlet and both chambers of a closing means for controlling outlet through which the medium is evacuated from chambers, and at least of one means for expelling the medium from the filled chamber.

A great advantage of this device also consists in the fact that, irrespective of the use to which it is put, it always remains possible to use the device for the measurement and/or the dosage of liquids or gasses, with great precision. A further important advantage is that the device operates practically noiselessly and that the pumping mechanism only makes a small reciprocating movement at relatively low speed.

Merely as an example, and without the slightest intent at limitation, a more detailed description will be given hereinafter of a chosen form of embodiment of a device according to the invention. This description refers to the appended drawings in which.

Figure 4:
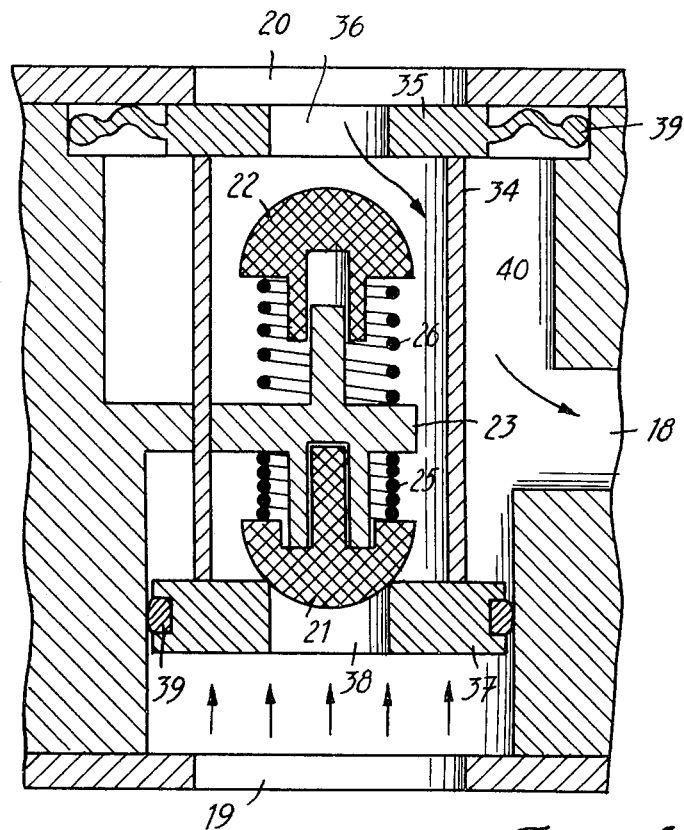

FIG. 4 also shows an enlarged longitudinal section of yet a further possible form of embodiment of the outlet valve mechanism.

Figure 1:
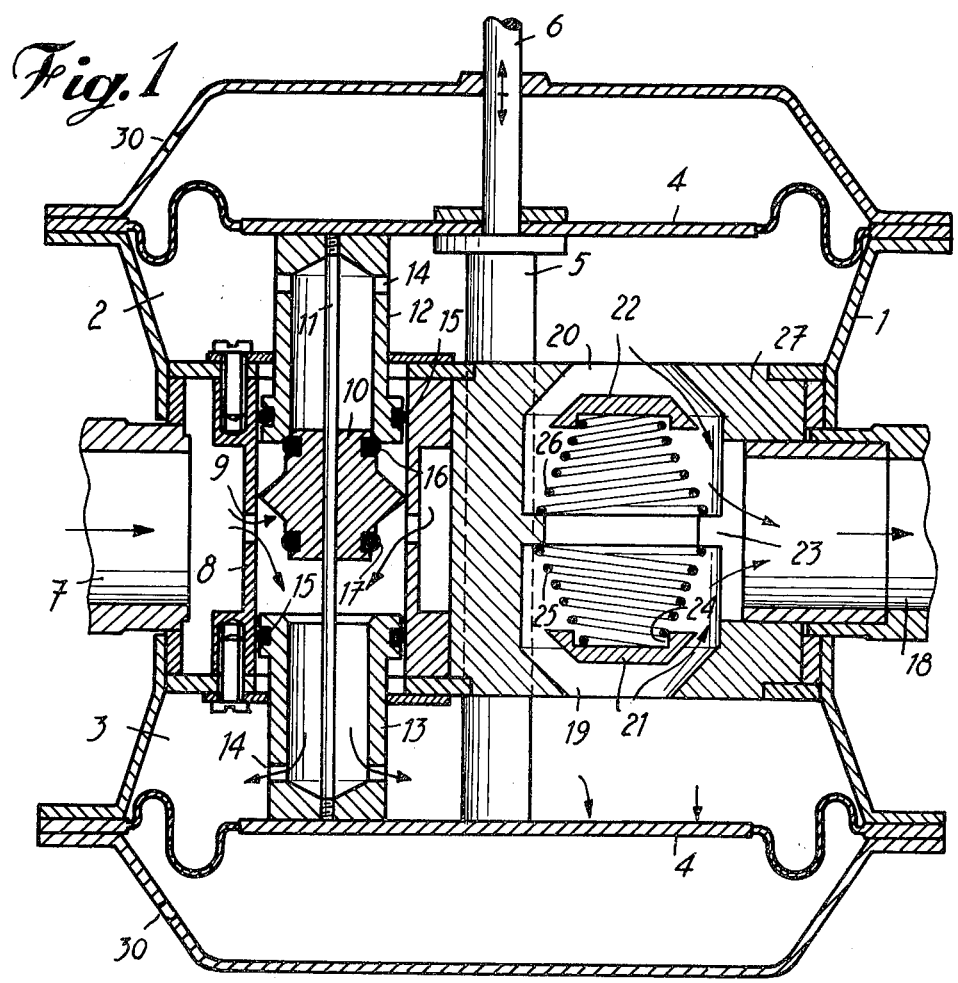
FIG. 1 illustrates a longitudinal section of the device, equipped as a liquid or gas meter.

In FIg. 1 it can be seen that the device, which in the present case operates in conjunction with a meter (not shown), is particularly well suited to be used as liquid or gas meter. The device has a housing 1 in which two chambers, respectively 2 and 3 are provided. Each of these chambers is fitted with a diaphragm 4 by means of which it is possible to expel the liquid or the gas which flows into the chamber, in such a manner that with each alternating movement of the diaphragm a precisely measured quantity of liquid or of gas is expelled. The two diaphragms are joined together by means of a rod 5, so that when a liquid or a gas enters one of the chambers so that the appropriate diaphragm is pressed away during the filling of said chamber, the diaphragm of the second chamber will expel the liquid or gas contained in the latter. In order to facilitate the alternating movement of the diaphragms, an opening 30 is provided in the space located behind them, through which the air can escape. For this purpose, an axial channel through rod 5 could be used by means of which the spaces behind the two diaphragms would be mutually interconnected. Rod 5 is extended by a connecting rod 6 which connects to a liquid or gas meter (not shown), whereby at each alternating movement of the diaphragms said meter is operated, thus measuring the quantity of expelled liquid or gas with precision. The liquid or gas alternately enters chambers 2 and 3 via a common inlet 7. For this purpose, a hollow cylinder 8 with radial openings 9 is fitted transversally in front of aforesaid inlet, a double conically shaped valve 10 being provided within this cylinder and being alternately displaced from the one side of openings 9 to the other. This valve is fitted so as to be able to move freely along guide rod 11 which mutually connects two guide bushings 12 and 13. The guide bushings are mobile within aforesaid hollow cylinder 8 and are each provided with a series of radial openings 14 and with a sealing ring 15. Valve 10 is also provided with a sealing ring 16–17 at each end, by means of which guide bushings 12–13 can alternately be shut off. The two chambers 2–3 are connected with each other by means of a cylinder 27 which connects to an outlet 18 through which the liquid or gas leaves the device. Valves, respectively 21 and 22, are provided in each respective opening 19 and 20 of cylinder 27, through which openings the liquid which leaves chambers 2–3 is evacuated via outlet 18. In order to maintain valves 21–22 in closed position, conical springs, respectively 25 and 26, are fitted between a central collar 23 in cylinder 27 and a recess 24 in each respective valve 21 and 22.

The operation of the previously described device is described hereinafter. In position of rest of the device, valve 10 is pressed by the liquid entering through inlet 7 against the inlet opening of guide bushing 12 for instance, so that no more liquid can reach chamber 2, which has previously been filled. Diaphragm 4 of this chamber has been displaced hereby in is most extended position so that this chamber is enlarged to its greatest volume. The liquid which is enclosed in cylinder 27 and in outlet 18, which is shut off by means of a cock, combines with the effect of springs 25–26 to press valves 21 and 22 firmly in openings 19–20, so that no liquid is allowed to reach outlet 18. As diaphragm 4 of chamber 2 is in its most extended position, and this diaphragm is connected via rod 5 with diaphragm 4 of chamber 3, the latter diaphragm will have reduced chamber 3 to its smallest volume. When the cock (not shown) fitted in outlet 18 is opened, liquid will immediately flow away from between valves 21–22, whereby the latter will open thus connecting both chambers 2–3 with outlet 18. Consequently the liquid will flow from filled chamber 2 via opening 20 to outlet 18, whereas the liquid entering chamber 3 via inlet 7 and guide bushing 13 with opening 14 presses diaphragm 4 of this chamber back thus increasing its volume. Simultaneously, diaphragm 4 of chamber 2 will be displaced by connecting rod 5 so that all the liquid will be expelled from this chamber into outlet 18. When diaphragm 4 has reduced chamber 2 to its smallest volume, the quantity of liquid which has flown through outlet 18 corresponds to the quantity of liquid displaced in chamber 2 and to the equivalent quantity of liquid which has flowed through chamber 3 and opening 19 of cylinder 27, whilst this chamber 3 has been gradually filled. During its displacement, diaphragm 4 of chamber 2 presses upon guide bushing 12 with valve 10, so that this valve is displaced beyond radial openings 9 of hollow cylinder 8. The liquid which continues to flow in through inlet 7 now presses valve 10 against the other guide bushing 13, so that the liquid can not enter the latter. Access to guide bushing 12, which was closed in the first place, is now open so that the liquid enters chamber 2 which has just been emptied, after which the operations previously described are alternately repeated in both halves of the device. A well determined quantity of liquid is consequently evacuated each time through outlet 18 and can easily be measured, for instance, by connecting the reciprocating rod 6 of a meter (not shown) to connecting rod 5.

Figure 2:
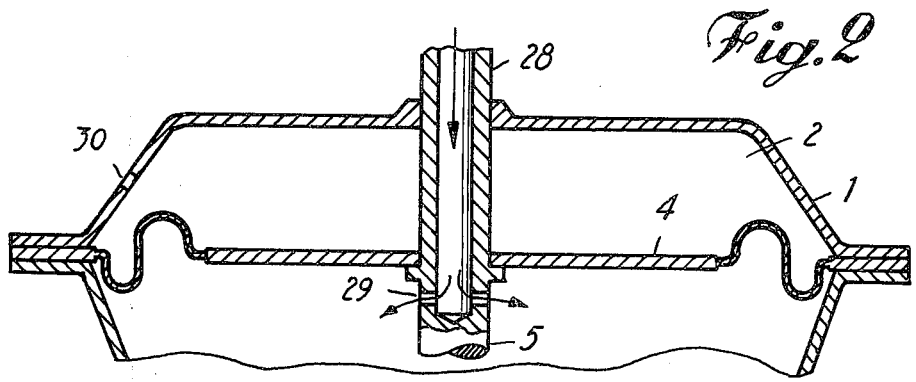
FIG. 2 shows a longitudinal section of a second form of embodiment of the top part of the device, which in this case is used as dosimeter.

By replacing aforesaid rod 6 and meter for instance by a hollow rod 28 with radial openings 29 which open up for instance in chamber 2, as illustrated in FIG. 2, a complementary liquid can be added to the measured off liquid via hollow rod 28, which added liquid, metered or not, is added via hollow rod 28 in a known manner and the only expelled liquid mixed with the added liquid is measured by means of rod 28 which rod gives an impulse to, for instance, an electric counting mechanism, by each alternating movement of said rod so that the entire device can be used as a dosimeter.

Figure 3:
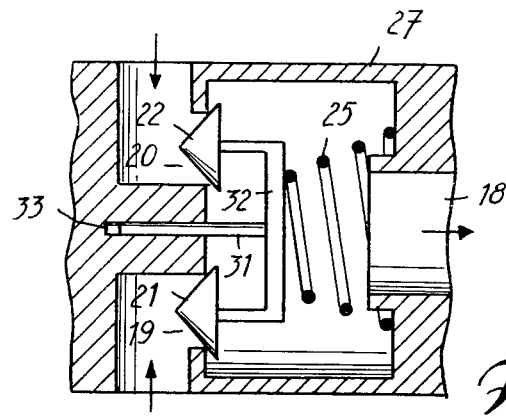
FIG. 3 shows an enlarged longitudinal section of an alternative to the outlet valve mechanism.

It is quite obvious that the elements described above may be of any shape or dimensions and that their relative arrangement may vary. It is also perfectly obvious that the parts described above may be replaced by others which serve the same purpose and that the device may be completed by further parts which might improve the practical operation thereof. The diaphragms could for instance be replaced by pistons in which the above described valve mechanisms 8 to 17 for the admission of liquid in chambers 2–3 have been incorporated. Similarly, valve 10 of said valve mechanism could consist of a ball, and both the inlet valve mechanism and the outlet valve mechanism could be replaced by other systems which serve the same purpose. As alternative to the outlet valve mechanism 19 to 27 use could for instance be made of a form of embodiment as shown in FIG. 3. This mechanism, in which the pressure on both valves 21–22 is very precisely distributed, has the advantage of operating silently and practically trouble-free. It will be noticed that in this case openings 19–20 can respectively be opened or closed simultaneously by valves 21–22. These valves are fitted to a common yoke 32 which also comprizes a guide pin 31 which operates in guide bore 33. Normally both valves are pressed in openings 19–20 by a conical spring applied between yoke 32 and the fixed part of the valve mechanism. The operation of this mechanism is the same as that which has previously been described for the form of embodiment illustrated in FIG. 1. Instead of valves 21–22 which open and close simultaneously, it is also possible to make use of two valves which would alternately close one of the openings 19–20 of cylinder 27, so that each time one of the filled up chambers 2–3 is alternately emptied. As shown in FIG. 4, valves 22–21 could be fitted with springs 25–26 between two discs 35–37, which are joined together by one or more elements 34, each of aforesaid discs being provided with an opening, respectively 36 and 38. Each opening can be closed by an associated valve, respectively 21 and 22. The entire assembly is axially mobile within a cylinder 40, provided on the one hand with two inlet openings 19–20, and on the other hand with an outlet opening 18. Sealing elements 39 of any appropriate sort assure an efficient sealing between discs 35–37 and cylinder 40. In this FIG. 4 it can clearly be seen that the liquid entering chamber 3 exerts a pressure on disc 37 whereby the latter is displaced axially in cylinder 40, so that valve 21 is pressed home and opening 38 is closed, so that no more liquid is allowed to pass to outlet 18, whereas the liquid from chamber 2 flows away to outlet 18. It is perfectly obvious, that many other forms of embodiment are possible, which remain within the scope of the present invention.

I claim:

1. Device for measuring a liquid or gas, comprising two separate chambers with a determinated content, a common inlet for both said chambers, a common outlet for both said chambers, a hollow cylinder with radial inlet openings, being solidly fitted transversally in front of the inlet of the device, an axially sliding guide bushing positioned in each end of said cylinder and extending into the adjacent one of said chambers, each bushing being provided with a through opening interconnecting said hollow cylinder with its adjacent chamber, a rod connecting both bushings, a valve being mounted on said rod and slidable between both guide bushings from one side of said radial openings in said cylinder to the other side and closing alternately the through opening of one of said guide bushings, means in each of said chambers for expelling alternately the medium out of each chamber, said means being interconnected and adapted to move alternately said guide bushings and the valve closing one of said bushings to the other side of the radial openings of said cylinder, closing means between the outlet of the device and both of said chambers and adapted to receive actuating pressure of the expelled medium.

2. Device as defined in claim 1, in which said valve is of double conical shape with a sharp top.

3. Device as defined in claiam 1, in which the closing means for controlling the outlet of the device, mainly consists of a hollow cylinder connecting said two chambers with said outlet, valve for each inlet opening of said cylinder, a spring provided between each valve and said cylinder and closing said valves in the direction of said chambers.

* * * * *